UNITED STATES PATENT OFFICE.

HERMANN JANSSEN, OF ELBERFELD, GERMANY, ASSIGNOR TO THE FARBENFABRIKEN, VORMALS FR. BAYER & CO., OF SAME PLACE.

SALICYLIC-ACID COMPOUND.

SPECIFICATION forming part of Letters Patent No. 492,868, dated March 7, 1893.

Application filed February 1, 1892. Serial No. 419,966. (Specimens.) Patented in France July 11, 1891, No. 214,810.

*To all whom it may concern:*

Be it known that I, HERMANN JANSSEN, doctor of philosophy, chemist, a subject of the Emperor of Germany, (assignor to the FARBENFABRIKEN, VORMALS FR. BAYER & Co., Elberfeld, residing at Elberfeld, in Germany, have invented a new and very valuable Medical Compound, (for the manufacture of which the aforesaid FARBENFABRIKEN have already obtained Letters Patent in France, No. 214,810, dated July 11, 1891,) of which the following is a specification.

My invention relates to the production of a new pharmaceutical compound useful as an antiseptic and antineuralgic of which the dose may be from sixteen to twenty-one and three-tenths grains every four hours by reducing the nitro phenyl ester of salicylic acid which corresponds to the formula:

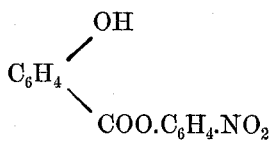

and which is obtained when salicylic acid is allowed to react upon para nitrophenol in the presence of dehydrating agents as described in the German Letters Patent No. 43,713, dated July 22, 1887, and by subsequently treating the thus formed amido phenylester of salicylic acid and with the necessary quantity of acetic anhydride or acetyle chloride in order to substitute one hydrogen atom of the amido group by an acetyl group.

In carrying out my process practically I proceed as follows: Four parts, by weight, of the nitrophenylester of salicylic acid are introduced into a mixture of five parts, by weight, of tin, fifteen parts, by weight, of fuming muriatic acid and ten parts, by weight, of alcohol. The nitro compound is slowly reduced which may be recognized as the nitro product is insoluble in the diluted alcoholic solution while the formed amido compound is dissolved. When the nitro ester has been totally reduced, viz when the latter has been dissolved, the alcohol is distilled off; on adding muriatic acid to the remaining mixture and on cooling the double salt of the formed amidophenylester of salicylicacid and stannic chloride formed by the above reaction separates in colorless needles. The resulting precipitate is filtered off and dissolved in hot water. The thus obtained solution is saturated with hydrogen sulphide gas in order to remove the tin. By adding sodium carbonate to the filtered acid solution the produced amidophenyl ester of salicylic acid is precipitated. The latter is filtered off, washed out, redissolved in acids and again precipitated with the aid of sodium carbonate. After filtering off and drying it is mixed with glacial acetic acid and the necessary quantity of acetic anhydride or acetyl chloride is added thereto. The reaction begins immediately, the temperature being spontaneously raised, and at first a clear solution results which gradually thickens by the formed acetylamido compound. The latter is filtered off, washed out and redissolved in alcohol out of which it separates in pure crystallized form. Instead of tin and hydrochloric acid, the corresponding quantity of iron-filings and muriatic acid may be employed for the reduction of the above nitro compound. The thus produced acetyl amidophenylester of salicylic acid which possesses the formula:

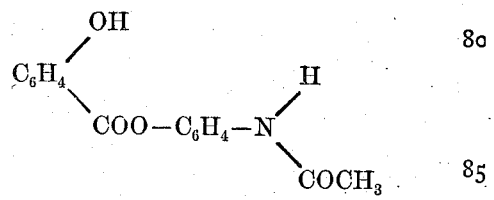

is characterized by the following properties: Out of alcohol or benzine it crystallizes in small white brilliant scales melting at 187° centigrade. It is almost insoluble in cold water, moderately soluble in hot water. In alcohol and in benzine it dissolves more easily and these solvents are most practically used to obtain the new acetyl-amidoproduct in crystallized form. From the non acetylized compound, viz., the amidophenylester of salicylic acid it differs by its melting point, and by its form of crystallization, as the former melts at 151° to 152° centigrade, and separates out of alcohol or benzine in flat tables likewise colorless.

The new acetylamidophenylester of salicylic acid is of very high value as antiseptic and antineuralgic.

Having thus described my invention and in what manner it can be performed, that which I claim as new, and desire to secure by Letters Patent, is—

1. The process of producing the antiseptic and antineuralgic compound herein described, which consists in reacting upon paranitrophenol in the presence of dehydrating agents substantially as described, with salicylic acid, reducing the nitro phenylester of salicylic acid thus obtained, and treating the formed amido phenylester of salicylic acid with acetic acid anhydride, or acetyl chloride in such quantity as is necessary for replacing one hydrogen atom of the amido group by the acetyl group.

2. As a new product the compound as hereinbefore described which corresponds to the formula:

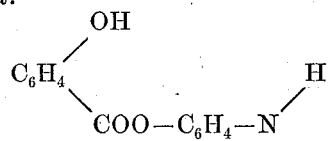

and which crystallizes out of alcohol or benzine in small white brilliant scales melting at 187° centigrade; is almost insoluble in cold water; by alcohol and benzine it is dissolved with great ease these solvents being most suitable for crystallizing the same; substantially as described.

In testimony whereof I have signed my name in the presence of two subscribing witnesses.

HERMANN JANSSEN.

Witnesses:
WM. ESSENREIN,
RUDOLPH FRICKE.